I. E. LITTEN.
TRAILER CONNECTION.
APPLICATION FILED NOV. 16, 1917.
1,276,548.
Patented Aug. 20, 1918.
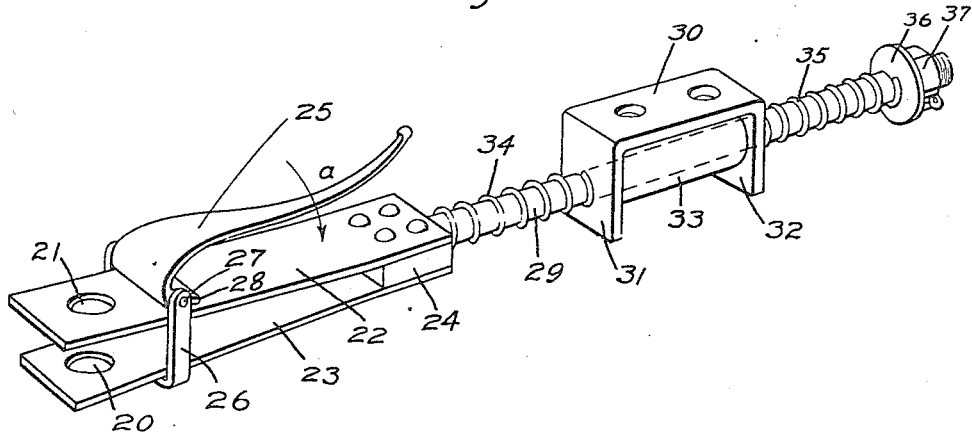
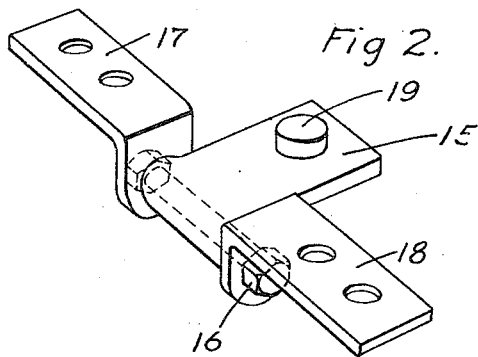
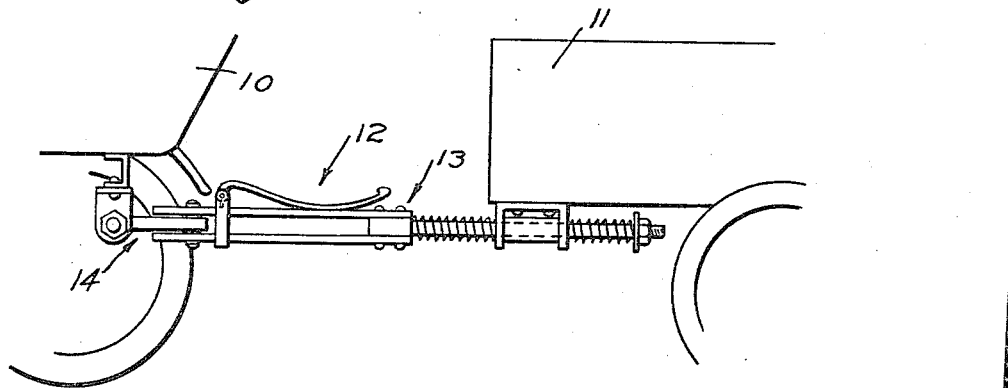
INVENTOR
IRA EUGENE LITTEN
BY Hazard and Miller
ATTORNEYS United States Patent Office.

IRA E. LITTEN, OF ORANGE, CALIFORNIA, ASSIGNOR TO MRS. MAGGIE M. LITTEN, OF ORANGE, CALIFORNIA.

TRAILER CONNECTION.

1,276,548.

Specification of Letters Patent. Patented Aug. 20, 1918.

Application filed November 16, 1917. Serial No. 202,264.

*To all whom it may concern:*

Be it known that I, IRA EUGENE LITTEN, a citizen of the United States, residing at Orange, in the county of Orange and State of California, have invented new and useful Improvements in Trailer Connections, of which the following is a specification.

This invention relates to a trailer coupling.

It is the principal object of this invention to provide a connection between a tractor and trailer which will permit the two vehicles to be readily connected or disconnected by a single operation and which is also provided with yieldable means for absorbing severe shocks which are delivered to either the trailer or tractor and thus prevent the coupling from being broken by the strains incident thereto.

Other objects will appear hereinafter.

The invention is illustrated, by way of example, in the accompanying drawings in which:

Figure 1 is a view in perspective illustrating the details of the draw-bar.

Fig. 2 is a view in perspective illustrating the draw-bar link which is secured to the tractor.

Fig. 3 is a view in side elevation illustrating the assembled coupling and further disclosing fragmentary portions of a tractor and trailer.

Referring more particularly to the drawings, 10 indicates a tractor, which may be a vehicle of any desired design and which is intended to draw a trailer 11. These two vehicles are detachably connected by a coupling 12, comprising a draw-bar 13 and a draft link 14. The draft link is formed of a shackle-plate 15 pivotally mounted for vertical swinging movement upon a bolt 16. This bolt extends through an eye in the shackle and also through ears upon bolting brackets 17 and 18. The brackets are of a design which will readily permit them to be bolted to the frame or body of the tractor, and to allow the shackle-plate to swing between them. A shackle pin 19 extends through the flat portion of the shackle-plate and provides a cylindrical projection upon the upper and lower faces of the plate adapted to be engaged by the draw-bar.

The pin 19, when in position, is in register with openings 20 and 21 formed through draw-bar clamping plates 22 and 23. These plates are superimposed one upon the other and are secured at one end to the opposite sides of a spacing block 24. The openings 20 and 21 occur in the opposite free ends of the plates. At this point the plates are sufficiently separated to allow the shackle-plate and its pin 19 to pass between the plates and thereafter be clamped in position by a clamping lever 25. This lever is pivotally supported above the plate 22 by a U-strap 26 which is fixed to the plate 23 and extends upwardly along the opposite sides of both plates to carry a pivot pin 27. A clamping lug 28 is formed as a part of the clamping lever and may be forced downwardly against the plate 22 to draw the two plates together.

Secured rigidly to the spacing block 24 and extending in longitudinal alinement to the plates 22 and 23 is a cylindrical draw-shaft 29 which passes through a U-shaped mounting bracket 30 adapted to be fastened to the trailer. This bracket slidably and rotatably and yieldingly supports the shaft and is reinforced between its parallel extensions 31 and 32 by a spacing pipe 33 through which the shaft extends. A rebound spring 34 is interposed between the adjacent faces of the spacing block 24 and the bracket extension 31, while a similar rebound spring 35 is disposed with one end against the opposite face of extension 32 and confined upon the shaft by a nut 37 and a washer 36.

The draw-bar construction 13 and the coupling construction 12 form a tongue for the trailer 11, and the springs 34 and 35 form a buffer or equalizer connection between the tractor and the trailer. The draw-bar 29 rotatably mounted in bearings in the bracket extensions 31 and 32 forms a rocking connection which allows the tractor and trailer to rock transversely independently of each other.

In operation, the tractor and trailer may be connected by placing the shackle-plate 15 between the free ends of the clamping plates 22 and 23 and the extensions of pin 19 in register with the openings 20 and 21. The lever 25 is then swung downwardly in the direction of the arrow —a—, as indicated in Fig. 1, and the two plates forced together by the action of the clamping lug 28. This will cause the pin to extend through the openings in the plates and provide the trailer with horizontal swinging movement in relation to the tractor. It will be further noted that due to the pivotal mounting of the shackle-plate, relative vertical movement may be had between the trailer and tractor, thus completing a universally yieldable connection. Relative movement between the tractor and trailer is compensated for by the springs 84 and 85, the action of which is evident.

It will thus be seen that the device here disclosed, while simple in construction, yet provides means for easily connecting a tractor and trailer, allowing universal movement in relation to each other, both horizontally, vertically and longitudinally.

While I have shown the preferred construction of my trailer connection for automobiles and the like as now known to me, it will be understood that various changes in the combination, construction and arrangement of parts may be made by those skilled in the art without departing from the spirit of my invention as claimed.

I claim:

As an article of manufacture, a trailer connection for automobiles and the like, comprising bolting brackets, a shackle plate between the bolting brackets, a bolt inserted through the bolting brackets and shackle plate to form a pivotal connection, a shackle pin fixed through the shackle plate and extending upwardly and downwardly, draw-bar clamping plates having openings in their front ends fitting upon the ends of the shackle pin above and below the shackle plate, a spacing block fixed between the opposite ends of the clamping plates, a U-strap secured to the lower clamping plate and extending above the upper clamping plate, a clamping lever pivotally connected to the upper ends of the U-strap, a clamping lug carried by the clamping lever to engage the upper clamping plate and force the plates toward each other and toward the shackle plate, and a cylindrical draw-shaft rigidly secured to the spacing block and adapted for connection to a mounting bracket.

In testimony whereof I have signed my name to this specification.

IRA E. LITTEN.